350-96.22 OR 3,982,815

United States
Nakayama

[11] 3,982,815
[45] Sept. 28, 1976

[54] CONNECTOR FOR LIGHT-TRANSMITTING CABLES

[75] Inventor: Osamu Nakayama, Tokyo, Japan

[73] Assignee: Nippon Electric Company, Ltd., Tokyo, Japan

[22] Filed: June 3, 1975

[21] Appl. No.: 583,163

[30] Foreign Application Priority Data
June 5, 1974 Japan.................................. 49-63782

[52] U.S. Cl.............................................. 350/96 C
[51] Int. Cl.².......................................... G02B 5/16
[58] Field of Search........... 350/96 C, 96 WG, 96 B, 350/96 BC

[56] References Cited
UNITED STATES PATENTS

| | | | |
|---|---|---|---|
| 3,846,010 | 11/1974 | Love et al. ......................... | 350/96 C |
| 3,861,781 | 1/1975 | Hasegawa et al. ................. | 350/96 C |
| 3,923,371 | 12/1975 | Dalgleish.......................... | 350/96 C |

OTHER PUBLICATIONS
Thiel et al., Article in "Applied Optics", vol. 13, No. 2, Feb. 1974, pp. 240–242.

Parfitt et al., Article in "Electronic Components", Jan. 28, 1972, pp. 69 and 73.75.

*Primary Examiner*—Vincent P. McGraw
*Assistant Examiner*—Stewart Levy
*Attorney, Agent, or Firm*—Hopgood, Calimafde, Kalil, Blaustein & Lieberman

[57] ABSTRACT

A connector for connecting the opposing ends of a pair of light-transmitting cables, or the like, includes a slit sleeve externally tapered in opposite directions. A pair of tubular members are arranged to respectively fit over the opposite ends of the sleeve and are axially displaceable to force the sleeve radially inwardly into clamping engagement with a pair of cable terminals fitted in the sleeve. The cable terminals are held in close contact with each other, thereby to ensure easy, efficient, and axially aligned coupling of the cables.

2 Claims, 4 Drawing Figures

CONNECTOR FOR LIGHT-TRANSMITTING CABLES

This invention relates to connectors for light-transmitting cables of optical fibers for use in connecting the opposing ends of a pair of light-transmitting cables with optical and mechanical accuracy.

It is often required in systems employing light-transmitting cables to connect the ends of a pair of such cables to one another, and connectors for achieving such connection have been developed. In making a connection between the ends of light-transmitting cables, the cables connected together must be placed with their respective optical axes aligned with each other with high accuracy and held stably in this connected state.

In order to obtain such highly accurate optical coupling, the previous practice has been to employ a time- and labor-consuming procedure in which the cables are brought into a relative angular position selected for optimum optical coupling therebetween by the manual operation of a fine adjustment device. This elaborate adjusting procedure is required each time one or both of the connected cables are replaced, for example, as a result of physical damage to the cable. Heretofore, no practically useful and readily detachable connector has been realized for use in connecting light-transmitting cables.

It is thus an object of the present invention to provide a connector for light-transmitting cables which overcomes the deficiencies encountered with previous forms of connectors and which is highly useful in practical applications.

It is a further object of the present invention to provide a connector of the type described which readily achieves excellent and reliable optical coupling between connected light-transmitting cables.

The connector of the invention includes a sleeve member having an outer wall surface that is tapered to the opposite ends thereof. The sleeve is flexible to permit radial expansion and contraction, thereby to enable optical coupling of the light-transmitting cables without any axial or angular misalignment.

The present invention is described in further detail with reference to the accompanying drawing, in which.

Figure 1:
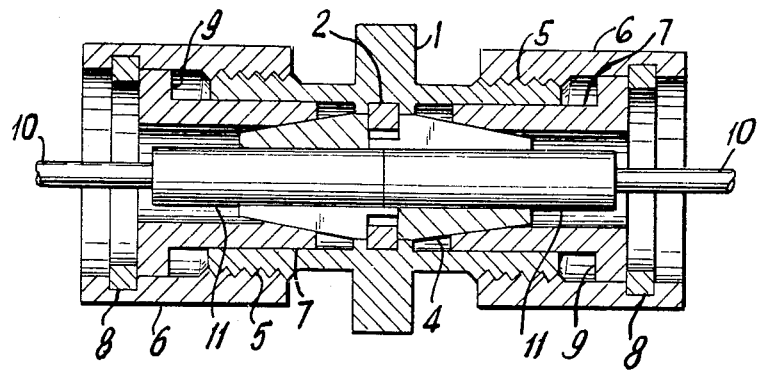
FIG. 1 is an axial cross-sectional view of a connector for light-transmitting cables according to one preferred embodiment of the present invention.
Figure 2:
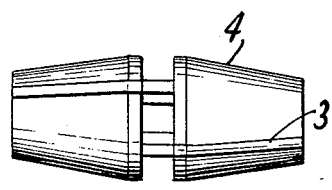
FIG. 2 is a side view of the flexible sleeve used in the embodiment of FIG. 1.
Figure 3:
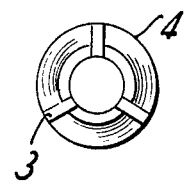
FIG. 3 is a front end view of the flexible sleeve of FIG. 2.

The connector illustrated in FIG. 1 includes a hollow cylindrical connector body 1. A tapered sleeve 4 is held in the central portion of the connector body in axially aligned relation by means of a snap ring 2. As shown in FIGS. 2 and 3, the sleeve 4 is formed with six radial slits 3, in two sets, extending axially from the opposite ends to the mid-portion of the sleeve. The connector body 1 is externally threaded along the opposite end portions thereof, as indicated at 5, for threaded fitting engagement with a pair of internally threaded tubular members 6. A flanged, generally cylindrical-shaped member 7 is fitted in each of the internally threaded tubular members 6 for axial sliding movement relative to the connector body 1 and is held in place by means of a snap ring 8 fitted in the threaded tubular member 6 for abutting engagement with a flange 9 of the cylindrical member 7. The flanged cylindrical member 7 has an internal diameter that is slightly larger than the outer diameter of the adjacent end of the sleeve 4 so that, as the threaded tubular member 6 is turned to press the flanged cylindrical member 7 against the tapered sleeve 4, the latter is forcedly reduced in diameter evenly without any radial distortion or axial misalignment.

To insert a pair of light-transmitting cables 10, the threaded tubular elements 6 are properly positioned to release the sleeve 4 and the terminal members 11 fitted to the opposing ends of the cables 10 are introduced into the connector structure through the opposite ends thereof until they make close contact with each other substantially in the middle portion of the sleeve 4. Subsequently, with the terminal members 11 properly held in place as inserted, the threaded tubular members 6 are turned in a tightening direction to such an extent that the sleeve 4, yielding under the pressure of the threaded tubular elements, is brought into pressure engagement with the terminal members 11. In this manner, the light-transmitting cables are accurately interconnected with their terminal members 11 held in close contact with each other.

Further, in the event that either of the light-transmitting cables 10 connected together is required to be replaced, as a result of damage or other reason, the replacement can be efficiently effected simply by the steps of releasing or turning back only the associated one of the threaded tubular members 6, withdrawing the damaged light-transmitting cable, inserting a new light-transmitting cable, and finally tightening up the threaded tubular member 6; no elaborate adjustment is needed.

Figure 4:
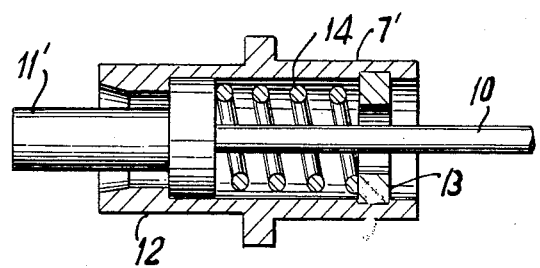
FIG. 4 is an axial cross-sectional illustration of a connector according to another preferred embodiment of the invention.

In the embodiment of the invention illustrated in FIG. 4, a coiled spring means is provided for each of flanged cylindrical members 7 in the embodiment of FIG. 1, to ensure close contacting interengagement of the terminal members fitted to light-transmitting cables 10 while facilitating insertion of the terminal members into the sleeve 4. More specifically, the spring means is shown in the form of a coiled spring 14 arranged in the flanged cylindrical member 7' between a snap ring 13 fitted therein and a flange formation 12 on the terminal member 11' to normally hold the coupling end face of the light-transmitting cable in a position axially biased out of the cylindrical member 7'.

Accordingly, the terminal members 11' of a pair of such light-transmitting cables, when inserted into the sleeve 4 as in the manner shown in FIG. 1, are held in pressure contact with each other under the action of coiled springs 14, and the desired optical connection between the opposing terminal members 11 is reliably obtained simply by turning the threaded tubular members 6.

In the embodiments of the invention that are hereinabove described, all of the components, exclusive of the light-transmitting cables 10, are formed of metal to ensure high machining accuracy, but it is to be understood that these components may be formed of any nonmetallic material as long as the required accuracy is obtained. Also, any rotation of the flanged cylindrical members 7 that may occur with the rotation of the threaded tubular members 6 can be effectively prevented to avoid the tendency of such rotation to distort the sleeve 4 fitted in the cylindrical members 7, for example, by providing the threaded end portions 5 of the connector body 1 with an axially extending slot, while on the other hand providing the cylindrical members 7 with a small projection adapted to slidably it in the slot. Further, although the slits 3 in the sleeve 4 are shown formed alternately in the right and left half portions of the sleeve in staggered relation, they may be formed, if desired, to extend straight over the whole length of the sleeve.

As will be readily appreciated from the foregoing, the connector for light-transmitting cables of the present invention is capable of optically coupling light-transmitting cables with high accuracy and without the danger of involving any axial or angular misalignment between the cables by the operation of the internally threaded tubular members. The connection or disconnection of the light-transmitting cables can be performed with particular ease and efficiency, making the connector of the invention highly valuable for practical applications. Thus, although the connector of the invention has been specifically described with respect to two embodiments thereof, it will be apparent that modifications may be made therein, all without necessarily departing from the spirit and scope of the invention.

What is claimed is:

1. A connector adapted to optically connect a pair of light-transmitting cables, each of which is respectively secured to tubular terminal members of substantially the same predetermined outer diameter, in a manner such that the optical axes of the two cables are aligned with each other; said connector comprising a cylindrical body member having axially and externally threaded opposite end portions, a flexible sleeve member secured in said body member coaxially with the cylindrical inner wall surface thereof and having a cylindrical inner wall surface of a diameter slightly larger than the outer diameter of the tubular terminal members, a tapered outer wall surface increasing in diameter from the opposite ends of said sleeve member toward the central portion thereof, and at least one slit formed in said sleeve member and extending axially over a distance smaller than the axial length thereof to allow said sleeve member to radially expand and contract, a pair of tubular members each having an outer diameter substantially equal to the inner diameter of said body member and an inner diameter larger than the outer diameter of said sleeve member at the opposite ends thereof and slidable axially of said body member to impart radially inward deformation to said sleeve member in cooperation with the tapered outer wall surface of said sleeve member, and clamping means cooperaive with the respective externally threaded end portions of said body member to urge the tubular terminal members axially inwardly against said sleeve member for pressure engagement therewith.

2. The connector as set forth in claim 1, further comprising spring means respectively arranged in the tubular members axially thereof for biasing the adjacent one of the terminal members axially into a position extended beyond the inner end of the tubular member.

* * * * *